(12) United States Patent
Milton et al.

(10) Patent No.: US 10,341,599 B2
(45) Date of Patent: Jul. 2, 2019

(54) METHOD AND DEVICE FOR RENDERING VIDEO CONTENT ON A DISPLAY

(71) Applicant: Adtoox AB, Stockholm (SE)

(72) Inventors: Oskar Milton, Sollentuna (SE); Emil Brolin, Huddinge (SE)

(73) Assignee: ADTOOX AB, Solna (SE)

( * ) Notice: Subject to any disclaimer, the term of this patent is extended or adjusted under 35 U.S.C. 154(b) by 0 days.

(21) Appl. No.: 15/566,123

(22) PCT Filed: Apr. 15, 2016

(86) PCT No.: PCT/EP2016/058389
§ 371 (c)(1),
(2) Date: Oct. 12, 2017

(87) PCT Pub. No.: WO2016/166314
PCT Pub. Date: Oct. 20, 2016

(65) Prior Publication Data
US 2018/0359444 A1    Dec. 13, 2018

(30) Foreign Application Priority Data
Apr. 16, 2015  (SE) ...................................... 1550457

(51) Int. Cl.
*H04N 5/445*    (2011.01)
*H04N 5/262*    (2006.01)
*H04N 7/01*     (2006.01)

(52) U.S. Cl.
CPC ....... *H04N 5/44591* (2013.01); *H04N 5/2624* (2013.01); *H04N 7/0122* (2013.01)

(58) Field of Classification Search
CPC ............. H04N 19/169; H04N 21/4728; H04N 21/8456
See application file for complete search history.

(56) References Cited

U.S. PATENT DOCUMENTS

2006/0059514 A1    3/2006  Hsiao et al.
2012/0033933 A1*   2/2012  Suzuki ............... G06K 9/00711
                                                   386/230
2012/0257108 A1*  10/2012  Friedlander ........ H04N 21/4314
                                                   348/563

FOREIGN PATENT DOCUMENTS

EP         2688308 A1    1/2014

OTHER PUBLICATIONS

MikeJVideosHD: "Michael Jackson—Billie Jean (Remastered HD 720p)" YouTube, Dec. 12, 2012, retrieved from the Internet: URL: https//www.youtube.com/watch?v=Pzs9fsYpsjs—1 page.

(Continued)

*Primary Examiner* — Olugbenga O Idowu
(74) *Attorney, Agent, or Firm* — RatnerPrestia (57) ABSTRACT

A method and device for rendering video content on a display. The device includes a processing unit and a memory, which memory contains instructions executable by the processing unit, whereby the device is operative to render the video content in one of a number of surfaces designated for displaying visual content on the display, while rendering at least one image extracted from the video content in at least another one of the surfaces; and render, when the video content reaches a point in time corresponding to a position where the at least one image is extracted from the video content, the video content in the another one of the surfaces thereby replacing the at least one image.

15 Claims, 7 Drawing Sheets

(56) References Cited

OTHER PUBLICATIONS

International Preliminary Report on Patentability for International Application No. PCT/EP2016/058389, dated Jul. 21, 2017—7 pages.
International Search Report and Written Opinion for International Application No. PCT/EP2016/058389, dated Jun. 27, 2016, 11 pages.
Written Opinion for International Application No. PCT/EP2016/058389, dated Mar. 14, 2017—6 pages.
Reply Written Opinion for International Application No. PCT/EP2016/058389, dated May 15, 2017—14 pages.
Swedish Office Action for Swedish Application No. 1550457-4, dated Oct. 26, 2015—10 pages.

* cited by examiner

METHOD AND DEVICE FOR RENDERING VIDEO CONTENT ON A DISPLAY

This application is a U.S. National Phase application of PCT International Application No. PCT/EP2016/058389, filed Apr. 15, 2016, which claims the benefit of SE 1550457-4, filed Apr. 16, 2015, both of which are incorporated by reference herein.

TECHNICAL FIELD

The invention relates to a method and device for rendering video content on a display.

BACKGROUND

Technology for playing, or rendering, video content on a display device such as a television (TV) set, a computer, a smart phone, a tablet, a billboard, etc., has been known for a long time, and is steadily evolving with new digital technology to for effectively utilizing resources for signal transmission and visualization. The video content to be displayed may be in the form of television broadcasts, movies, advertising material, Youtube cuts, etc.

For instance, with today's relatively small resource constraints, the display of video content can rapidly commence on different equipment, and some equipment even enables for a user to move the displayed video content across the display device without the occurrence of any disturbing artefacts.

A problem with displaying video content as discussed hereinabove is that format of the video content oftentimes differ from format of a surface designated for displaying visual content on the display device. For instance, a video content to be rendered on a computer screen ma have an aspect ratio of 16:9 (1.78:1), i.e. a width of 16 units and a height of 9 units, while the area of the computer screen where the video content is to be displayed allows for an aspect ratio of 6:1. Thus, if the 16:9 video content is to be displayed on the on area of the computer screen with its proportions maintained, there will be a great section on each side of the displayed 16:9 video content which is unutilized due to the different proportions of the 16:9 video content and the 6:1 area of the computer screen. To contrary, if the 16:9 video content is adapted to utilize the full width of the 6:1 area of the computer screen, a great part of the 16:9 format video content will reside outside of the area and is thus not visible.

SUMMARY

An object of the present invention is to solve, or at least mitigate, this problem in the art and to provided an improved method and device for rendering video content on a display device to better make use of available viewing area of the display device.

This object is solved according to a first aspect of the invention by a method of rendering video content on a display device. The method comprises rendering the video content in one of a number of surfaces designated for displaying visual content on the display device, while rendering at least one image extracted from the video content in at least another one of the surfaces. The method further comprises rendering, when the video content reaches a point in time where the at least one image has been extracted from the video content, the video content in said another one of the surfaces thereby replacing the at least one image.

This object is solved according to a second aspect of the invention by a device configured to render video content on a display. The device comprises a processing unit and a memory, which memory contains instructions executable by the processing unit, whereby the device is operative to render the video content in one of a number of surfaces designated for displaying visual content on the display, while rendering at least one image extracted from the video content in at least another one of the surfaces; and render, when the video content reaches a point in time corresponding to a position where said at least one image is extracted from the video content, the video content in said another one of the surfaces thereby replacing said at least one image.

Hence, the video content is rendered in a first out of a number of surfaces designated for displaying visual content on the display device while at least one image extracted from the video content is rendered in a second one of the surfaces. The video content will play in the first surface until it reaches a point in time corresponding to a position where the image of the second surface has been extracted from the video content. At that point in time, the video content will advantageously be "moved" from the first surface to the second surface of the display device, where it will be rendered and thus replace the image that was rendered in the second surface up until said point in time.

Advantageously, the rendered video content will be moved over the surfaces designated for video displaying until it has finished playing, resulting in a better utilization of the available viewing area of the display device. Further, by arranging the surfaces with at least one image extracted from the video content, the video content being moved to replace the image when the rendering of the video content reaches the point in time corresponding to the position of the image where it was extracted from the video content, a seamless and smooth transition will advantageously be made. The arrangement of the surfaces may in practice advantageously take on any form depending on the dimensions of the available viewing area of the display device.

In an embodiment of the present invention, a plurality of images extracted from the video content will be used; one in a respective surface. The video content will be rendered in one of the surfaces and when it reaches a point in time corresponding to a position at which one of the plurality of rendered images is extracted from the video content, it will be moved to—and rendered in—the surface containing the corresponding image, where the video content will be rendered until it reaches a point in time corresponding to a position at which another one of the plurality of rendered images is extracted from the video content. Again, the video content will be moved, this time to the surface containing said another one of the images, and replace that image in that surface. This will continue either until the video content has been rendered in all available surfaces, or until it has finished playing, at which instant it typically starts over from the beginning in the first surface where it initially was rendered (or a new video content is rendered in the same manner). Advantageously, this provides for a highly effective utilization of available viewing area of the display device, where the surfaces can be arranged in an appropriate manner to best make use of the available viewing area of the display device.

Generally, all terms used in the claims are to be interpreted according to their to ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
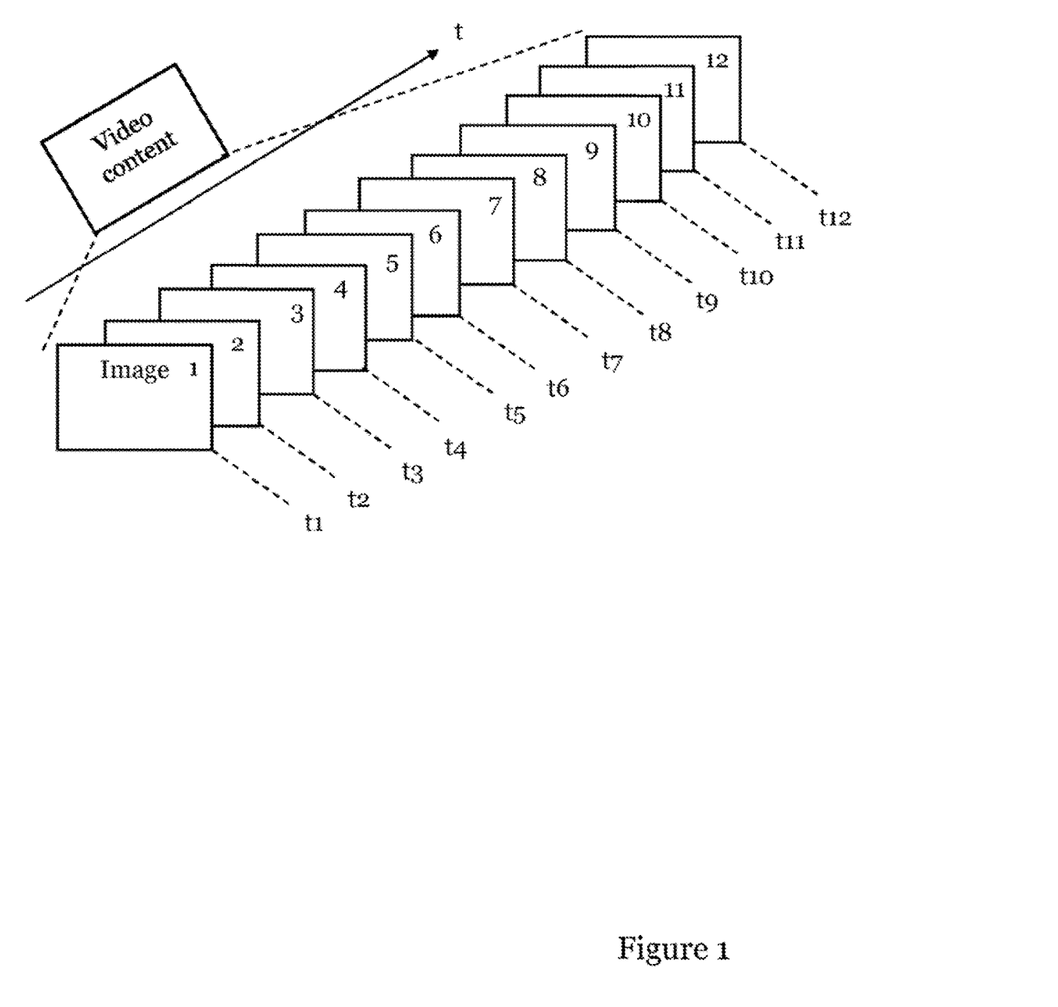
FIG. 1 illustrates video content to be rendered on a display device from which a number of images may be extracted according to an embodiment of the invention.

FIG. 1 illustrates images, extracted from video content, to be rendered on a display device according to an embodiment of the invention. FIG. 1 illustrates the video content from which any number of images 1-12, located at different positions in time t1-t12 may be extracted from the video content.

Figure 2:
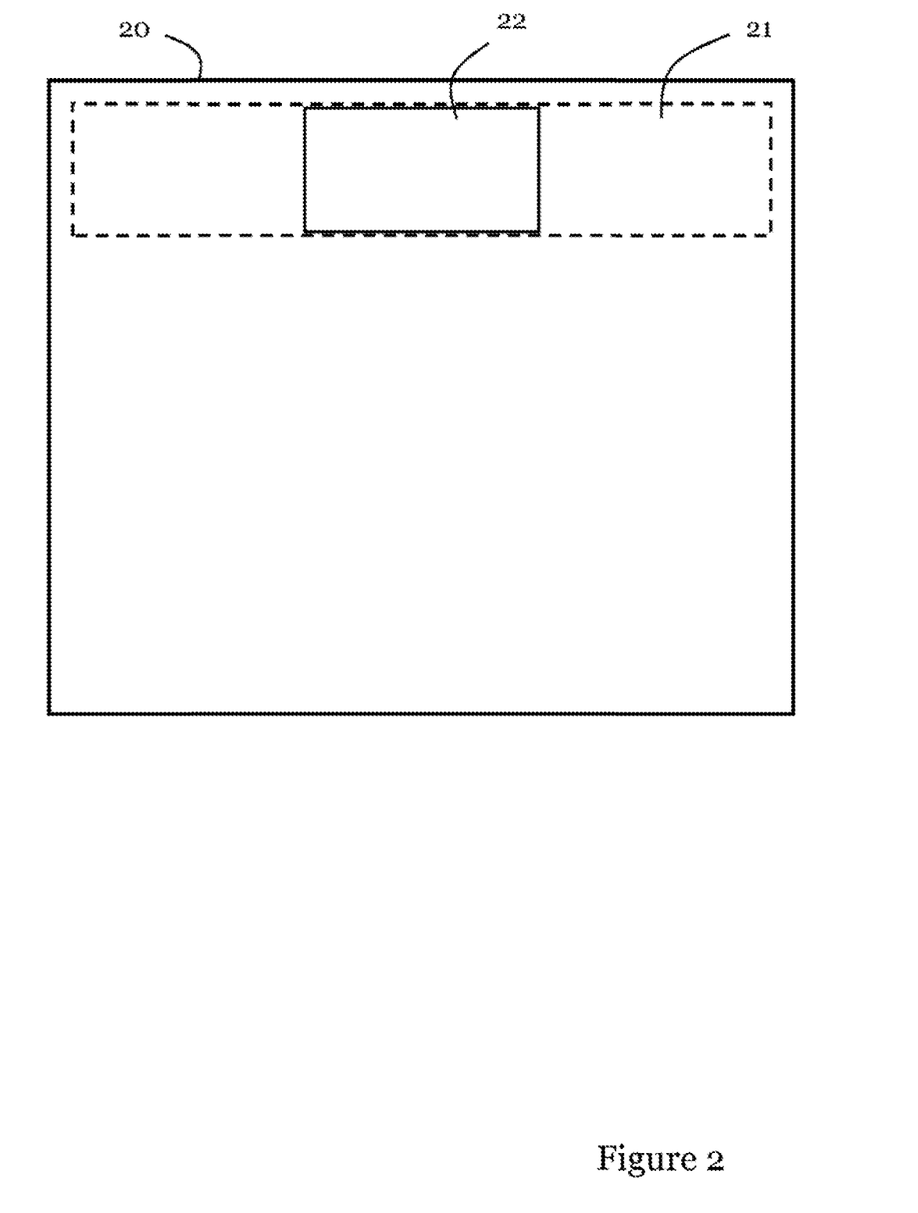
FIG. 2 illustrates a prior art display device having an area designated for displaying a particular visual content.

FIG. 2 illustrates a prior art display device 20, such as a computer screen, arranged with an area 21 designated for displaying a particular visual content on the display device 20. Now, in such an area 21, it is difficult to fit video content due to the dimensions of the area 21. In this particular illustrating example, a content provider wishing to display video content 22 in the designated display area 21 would render the video content 22 as is shown in FIG. 2, thereby making non-effective use of the display area 21.

Figure 3A:
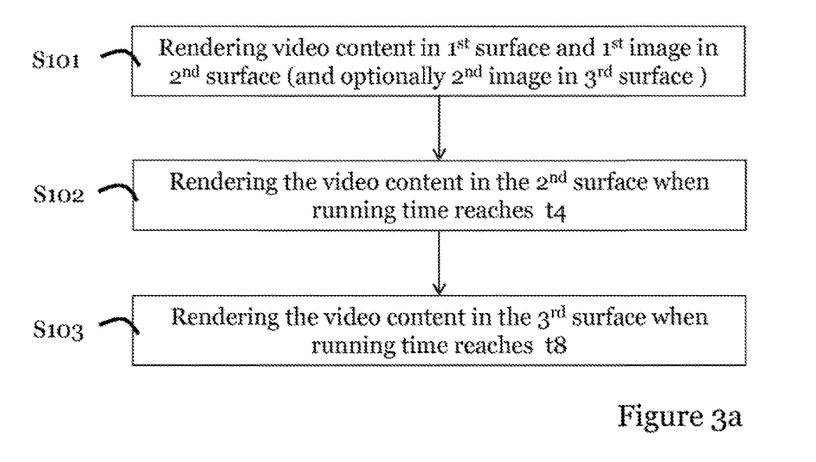
FIG. 3a illustrates a flowchart of the method of rendering video content according to an embodiment of the present invention.

FIG. 3a illustrates a flowchart of the method of rendering video content according to an embodiment of the present invention. It should be noted that the exemplifying embodiment implements three surfaces in which video content is displayed. However, it is understood that more efficient use of the display area 21 advantageously is obtained already when displaying video content in two surfaces.

Figure 3B:
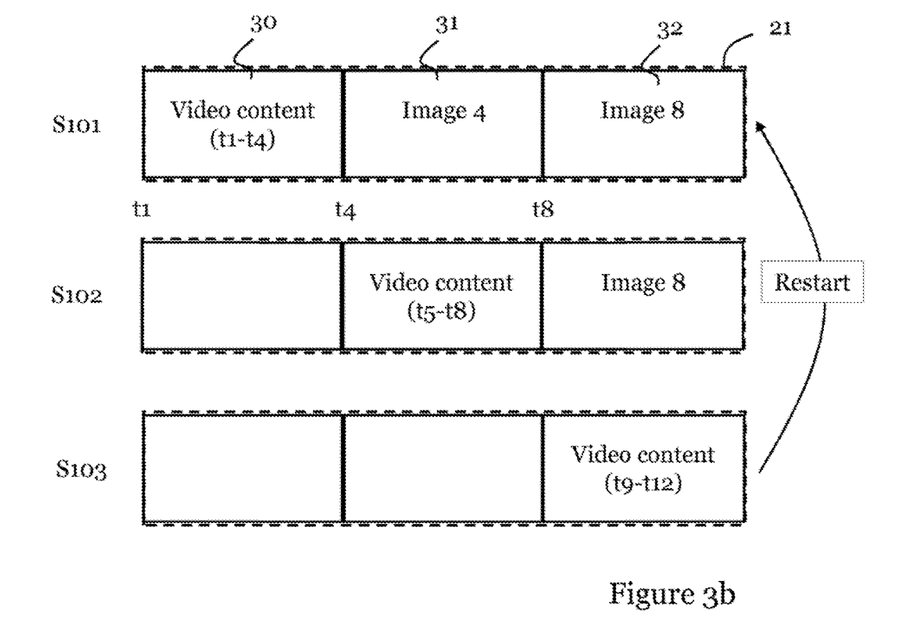
FIG. 3b illustrates the designated display area of the display device of FIG. 2, but where the method of rendering video content according to the embodiment of FIG. 3a is implemented.

FIG. 3b illustrates the designated display area 21 of the display device 20 of FIG. 2, but where the method of rendering video content according to the embodiment of FIG. 3a is implemented.

Now, in a first step S101, video content ranging from t1 to t4 is rendered in a first surface 30 of the area 21 designated for displaying visual content on the display device 20, while at least one image extracted from the video content is rendered in another one of the surfaces. In this particular embodiment, a first image 4 is rendered in a second surface 31 while a second image 8 is rendered in a third surface 32.

In step S102, when the video content rendered in the first surface 30 reaches a point in time t4 corresponding to a position where the first image 4 in the a second surface 31 is extracted from the video content, the video content is rendered in the second surface 31 instead, where it thus will replace the first image 4 that was rendered in the second surface 31 up until said point in time t4.

As previously mentioned, using two surfaces 30, 31 will advantageously make better use of the display area 21 of the display device 20.

In a third step S103, when the video content rendered in the second surface 31 content reaches a point in time t8 corresponding to a position where the second image 8 in the third surface 32 is extracted from the video content, the video content is rendered in the third surface 32, where it will replace the second image 8 that was rendered in the third surface 32 up until the point in time t8 where the second image 8 initially was extracted from the video content.

Advantageously, the rendered video content will be moved over the three to surfaces 30, 31, 32 designated for video display until it has finished playing, in this particular example at t12, resulting in a better utilization of the available viewing area 21 of the display device 20. As can be seen in FIG. 3b, the entirety of the viewing area 21 is advantageously utilized by having the video content move over the three surfaces 30, 31, 32. Further, by arranging the surfaces 31, 32 with a respective image 4, 8 extracted from the video content, where the video content is moved to replace and "blend" with the image 4, 8 when the rendering of the video content reaches the point in time t4, t8 corresponding to the position of the image 4, 8 where it was extracted from the video content, a seamless and smooth transition will advantageously be made.

Hence, in case e.g. a 16:9 video content is to be rendered in a 6:1 viewing area, the three surfaces 30, 31, 32 (that the video content would be moved across) would almost entirely fill out the 6:1 area and leave just a small section of unused viewing space.

Figure 4:
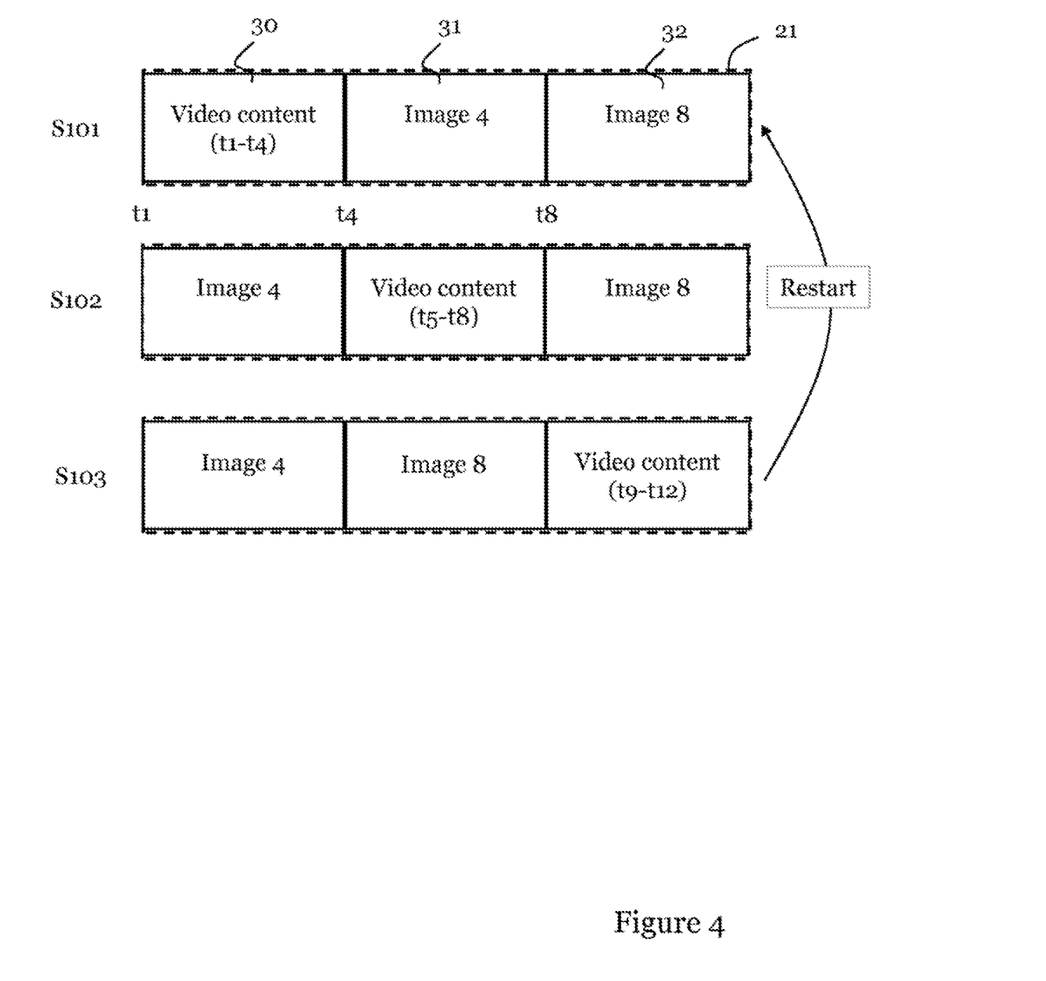
FIG. 4 illustrates a further embodiment of the method of rendering video content according to the invention.

FIG. 4 illustrates a further embodiment of the method of rendering video content according to the invention. When the video content rendered in the first surface 30 content reaches a point in time t4 corresponding to a position where the first image 4 in the second surface 31 is extracted from the video content in step S102, the video content is rendered in the second surface 31 instead, where it thus will replace the first image 4 that was rendered in the second surface 31 up until said point in time t4. However, in this embodiment, the first image 4 (i.e. the image that would be extracted from the video content when the content is reaching running time t4) will be rendered in the first surface 30.

Correspondingly, when the video content rendered in the second surface 31 content reaches a point in time t8 corresponding to a position where the second image 8 in the third surface 32 is extracted from the video content in step S103, the video content is rendered in the third surface 32, where it will replace the second image 8 that was rendered in the third surface 32 up until the point in time t8 where the second image 8 initially was extracted from the video content, and the second image 8 will be rendered in the second surface 31.

Advantageously, this will provide for an even smoother transition of the video content being rendered in the three surfaces 30, 31, 32.

It should be noted that it is not necessarily the last image 4 extracted from the video content that is shown in the first surface 30 in step S102 (or correspondingly the last image 8 that is shown in the second surface 31 in step S103), but an image similar in appearance to the respective last image 4, 8. In an embodiment, it can well be the respective subsequent image 5 and 9 that is rendered instead, or any image extracted from the video content which is not too far offset from the position of an image of the video content occurring at the point in time where the video content replaces an image in a subsequent surface.

For instance, an image may be extracted from the video content at a position corresponding to a point in time which is offset up to 0.5 seconds (in any direction) from a point in time where the video content replaces an image in a subsequent surface. It may further be envisaged that the image comprises added information in the form of e.g. text information.

In a further embodiment of the invention, an image extracted from one of the last positions of the video content, for instance image 11 or 12 in the example of FIG. 4, is rendered in a last 32 of the number of surfaces 30, 31, 32 designated for displaying visual content on the display device, without the video content ever being displayed in the last surface 32.

Figure 5:
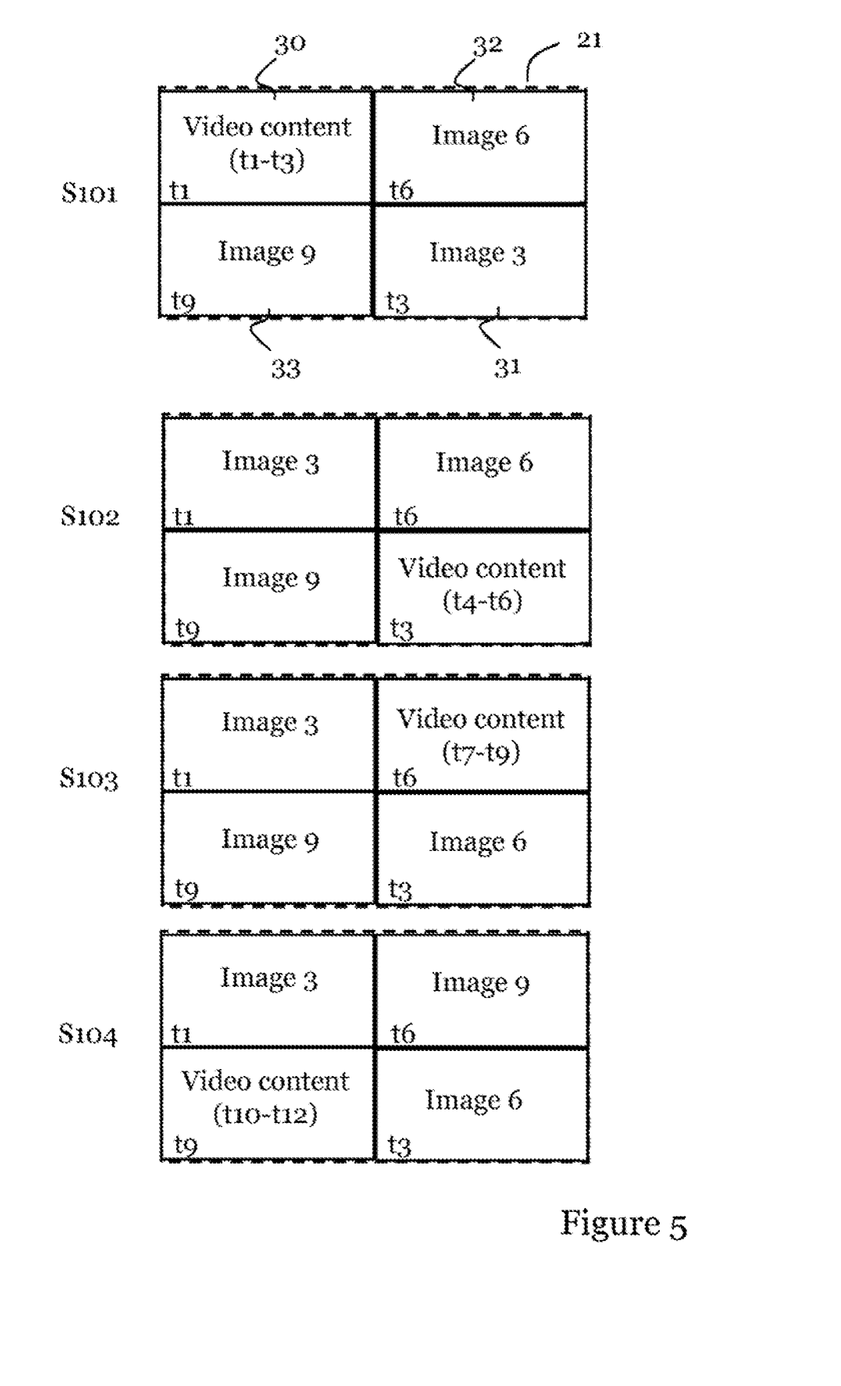
FIG. 5 shows an alternative arrangement of the surfaces in which the video content and the images are rendered.

FIG. 5 shows an alternative arrangement of the surfaces in which the video content and the images are rendered. As previously mentioned a many ways of arranging the surfaces can be envisaged, depending on the dimensions of the available viewing area of the display device. In the alternative arrangement of to FIG. 5, four surfaces are used instead of three as was described with reference to FIGS. 3 and 4.

In a first step S101, to video content ranging from t1 to t3 is rendered in a first surface 30 of the area 21 designated for displaying visual content on the display device 20, while rendering a first image 3 forming part of the video content in a second surface 31, a second image 6 in a third surface 32, and a third image 9 in a fourth surface 33.

In step S102, when the video content rendered in the first surface 30 reaches a point in time t3 corresponding to a position where the first image 3 in the second surface 31 is extracted from the video content, the video content is rendered in the second surface 31 instead, where it thus will replace the first image 3 that as rendered in the second surface 31 up until time t3. As previously discussed with reference to the embodiment illustrated in FIG. 4, the first image 3 (i.e. the image that would be extracted from the video content when the content is reaching running time t3) will optionally be rendered in the first surface 30.

In a third step S103, when the video content rendered in the second surface 31 content reaches a point in time t6 corresponding to a position where the second image 6 in the third surface 32 is extracted from the video content, the video content is rendered in the third surface 32, where it will replace the second image 6 that was rendered in the third surface 32 up until the point in time t6 where the second image 6 initially was extracted from the video content. The second image 6 will be rendered in the second surface 31.

Finally, in a fourth step S104, when the video content rendered in the third surface 32 reaches a point in time t9 corresponding to a position where the third image 9 in the fourth surface 33 is extracted from the video content, the video content is rendered in the fourth surface 33, where it will replace the third image 9 that was rendered in the fourth surface 33 up until the point in time t9 where to the third image 9 initially was extracted from the video content, while the second image 9 will be rendered in the third surface 32.

Figure 6:
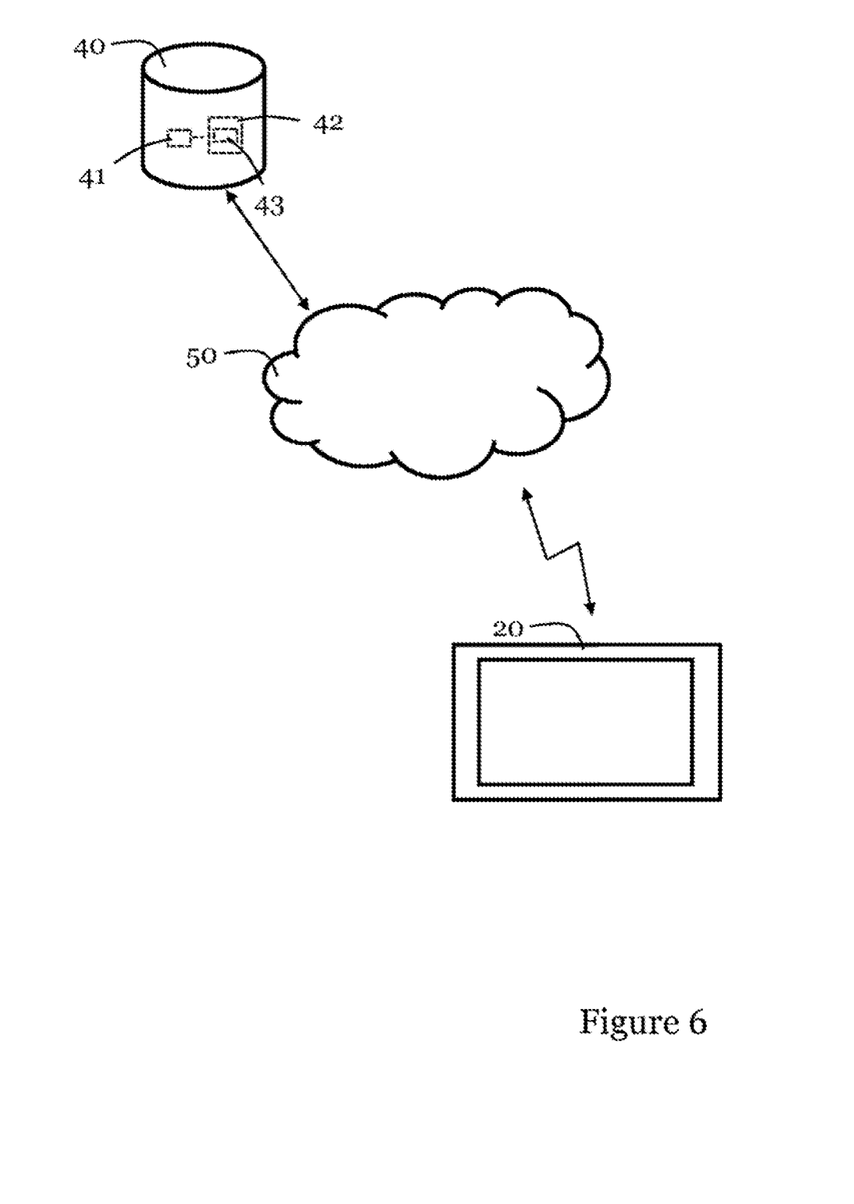
FIG. 6 illustrates a device according to an embodiment of the invention for performing the method of rendering content on a display device.

FIG. 6 illustrates a device 40 according to an embodiment of the invention for performing the above described method of rendering content on a display device 20. The device 40 may be embodied in the form of e.g. a server communicating with a display device 20, for instance a TV set, via an appropriate network 50 such as the Internet.

In practice, the method at the device 40 is typically performed by a processing unit 41 embodied in the form of one or more microprocessors arranged to execute a computer program 43 downloaded to a suitable storage medium 42 associated with the microprocessor, such as a Random Access Memory (RAM), a Flash memory or a hard disk drive. The processing unit 41 is arranged to carry out the method according to embodiments of the present invention when the appropriate computer program 43 comprising computer-executable instructions is downloaded to the storage medium 42 and executed by the processing unit 41. The storage medium 42 may also be a computer program product comprising the computer program 43. Alternatively, the computer program 43 may be transferred to the storage medium 42 by means of a suitable computer program product, such as a Digital Versatile Disc (DVD) or a memory stick. As a further alternative, the computer program 43 may be downloaded to the storage medium 42 over a network. The processing unit 41 may alternatively be embodied in the form of a digital signal processor (DSP), an application specific integrated circuit (ASIC), a field-programmable gate array (FPGA), a complex programmable logic device (CPLD), etc.

In case the display device is a TV set 20, the server 40 according to the invention will typically manage the rendering and display the appropriate video content on the TV set 20; hence the video content and image(s) displayed on the TV set 20 is managed remotely from the server 20, while the TV set 20 displays the content as controlled by the server 40.

Figure 7:
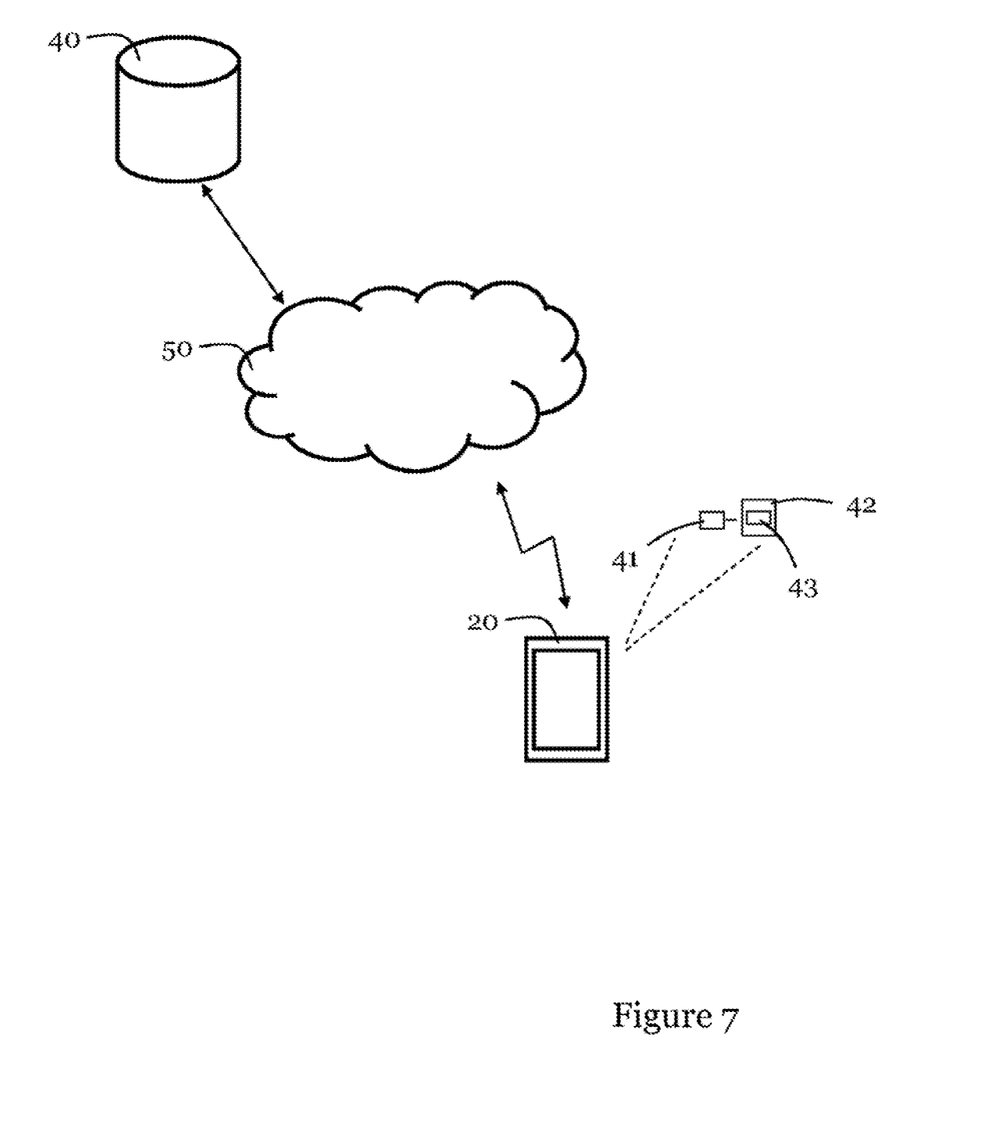
FIG. 7 illustrates a device according to a further embodiment of the invention for performing the method of rendering content on a display device.

FIG. 7 illustrates a further embodiment of the invention where the rendering according to the invention is managed at the display device 20 itself (here in the form of a smart phone) by means of the processing unit 41, the storage medium 42 and the computer program 43 as previously described. In this embodiment, the computer program 43 (possibly an app) may be transferred from a central device 40, such as a server, via the Internet. The computer program 43 causes the smart phone 20 to perform the method of rendering video content (possibly received from the server 40) according to the invention when executed on the processing unit 20. Thus, in contrast to the embodiment shown in FIG. 6, the method of rendering the video content is performed locally at the smart phone 20, even though the actual video content to be rendered may be provided from a central device such as the server 40.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of continuously rendering video content on a display device, the method comprising:

rendering the video content in one of a number of surfaces designated for displaying visual content on the display device, while rendering at least one image extracted from the video content in at least another one of the surfaces; and automatically rendering, when the video content reaches a point in time corresponding to a position where said at least one image is extracted from the video content, the video content in said another one of the surfaces thereby replacing said at least one image; and automatically rendering, in the surface in which the video content was rendered before being rendered in another surface, an image similar in appearance to the image extracted from the video content at the position that corresponds to the point in time which is reached when the video content is rendered in said another surface.

2. The method of claim 1, wherein the step of rendering at least one image extracted from the video content in at least another one of the surfaces further comprises:

rendering a plurality of images extracted from the video content, each of the plurality of images being rendered in a respective one of the surfaces, and wherein the video content is rendered, when the video content reaches a point in time corresponding to a position where any one of the plurality of images is extracted from the video content, in the surface of the one of the plurality of images being extracted at the position corresponding to said point in time.

3. The method of claim 1, further comprising:

rendering, in the surface in which the video content was rendered before being rendered in another surface, the image extracted from the video content at the position that corresponds to the point in time which is reached when the video content is rendered in said another surface.

4. The method of claim 1, further comprising:

rendering, in the surface in which the video content was rendered before being rendered in another surface, an image extracted from the video content at a next subsequent position with respect to the point in time which is reached when the video content is rendered in said another surface.

5. The method of claim 1, wherein the video content being rendered in said another surface starts from a position corresponding to a next subsequent point in time as compared to the image that was rendered in said another surface before being replaced by the video content.

6. The method of claim 1, further comprising:

rendering, in a last of the number of surfaces designated for displaying visual content on the display device, an image extracted from one of the last positions of the video content.

7. A device configured to continuously render video content on a display, which comprises a processing unit and a memory, said memory containing instructions executable by said processing unit, whereby said device is operative to:

render the video content in one of a number of surfaces designated for displaying visual content on the display, while rendering at least one image extracted from the video content in at least another one of the surfaces; and automatically render, when the video content reaches a point in time corresponding to a position where said at least one image is extracted from the video content, the video content in said another one of the surfaces thereby replacing said at least one image; and automatically render, in the surface in which the video content was rendered before being rendered in another surface, an image similar in appearance to the image extracted from the video content at the position that corresponds to the point in time which is reached when the video content is rendered in said another surface.

8. The device of claim 7, further being operative to:

render a plurality of images extracted from the video content, each of the plurality of images being rendered in a respective one of the surfaces, and wherein the video content is rendered, when the video content reaches a point in time corresponding to a position where any one of the plurality of images is extracted from the video content, in the surface of the one of the plurality of images being extracted at the position corresponding to said point in time.

9. The device of claim 7, further being operative to:

render, in the surface in which the video content was rendered before being rendered in another surface, the image extracted from the video content at the position that corresponds to the point in time which is reached when the video content is rendered in said another surface.

10. The device of claim 7, further being operative to:

render, in the surface in which the video content was rendered before being rendered in another surface, an image extracted from the video content at a next subsequent position with respect to the point in time which is reached when the video content is rendered in said another surface.

11. The device of claim 7, wherein the video content being rendered in said another surface starts from a position corresponding to a next subsequent point in time as compared to the image that was rendered in said another surface before being replaced by the video content.

12. The device of claim 7, further being operative to:

render, in a last of the number of surfaces designated for displaying visual content on the display device, an image extracted from one of the last positions of the video content.

13. A computer program product comprising a non-transitory computer readable medium, the computer readable medium having a computer program product comprising computer-executable instructions for causing a device to perform steps recited in claim 1 when the computer-executable instructions are executed on a processing unit included in the device.

14. The method of claim 1, wherein each of the surfaces designated for displaying visual content on the display device comprises a region having a fixed size.

15. The device of claim 7, wherein each of the surfaces designated for displaying visual content on the display device comprises a region having a fixed size.

* * * * *